ANALOG-TO-DIGITAL CONVERSION SYSTEM

Filed May 2, 1963

2 Sheets-Sheet 1

INVENTOR.
Osamu Tada
BY
Hill, Sherman, Meroni, Gross & Simpson
ATTORNEYS

Oct. 3, 1967

OSAMU TADA 3,345,630

ANALOG-TO-DIGITAL CONVERSION SYSTEM

Filed May 2, 1963

2 Sheets-Sheet 2

INVENTOR.
Osamu Tada

BY

Hill, Sherman, Meroni, Gross & Simpson

ATTORNEYS

United States Patent Office 3,345,630

Patented Oct. 3, 1967

3,345,630

ANALOG-TO-DIGITAL CONVERSION SYSTEM

Osamu Tada, Tokyo, Japan, assignor to Kabushikikaisha Yokogawa Denki Seisakusho (Yokogawa Electric Works Ltd.), Tokyo, Japan, a corporation of Japan Filed May 2, 1963, Ser. No. 277,628

Claims priority, application Japan, May 14, 1962, 37/19,399

3 Claims. (Cl. 340—347)

This invention relates to an analog-to-digital conversion system such that voltages are compared successively, and more particularly to a system of this kind in which direct current voltage is converted into alternating current and the alternating current voltage is compared with a reference voltage.

There has been recently proposed and put into practical use the so-called computer control system in which a digital electronic computer is introduced into a process control. In such a system, in response to a program and a selective command signal which have been previously incorporated in a computer, analog signals (composed mainly of direct current signals of low level in general) to be transmitted from transducers provided respectively for detecting temperature, pressure, flow quantity and the like, are sampled by sampling devices and amplified by amplifiers, thereafter they are digitized by an analog-to-digital converter and introduced into the computer. In the above sampling stage and the amplification stage, there have heretofore been some technical problems to make the system impracticable, some of which will hereinbelow be referred to.

There are often troubles due to outside induced noises coming from the transducers and their transmission lines and due to noises produced in the switching circuit used in a sampler circuit. The outside induced noises may be damped by inserting a suitable low-pass filter at the preceding stage of the sampler circuit. However, the noises to be produced in the switching circuit, particularly spike voltages due to the on-and-off operation of transistors when a transistor chopper is used in the switching circuit, result in errors when digitization. Furthermore, a comparator circuit, in principle, must compare signals of high level direct current, and hence if input direct current signals are of low level (for instance 0–10 mv.), a direct current amplifier is necessary for amplifying the signals up to a high level of, for example 0–10 v. However, as a direct current amplifier having a broad band amplification characteristic from direct current to high frequency region there are direct-coupled or modulation type direct current amplifiers, but the former does not suit for amplification of low level signals because it causes drift. The latter, namely the modulation type direct current amplifiers is composed of cascade circuits such as a DC–AC converter circuit for once converting input direct current signals into alternating current signals, an alternating current amplifier circuit for amplifying the converted alternating current signals and a phase sensitive rectifier for converting once more the amplified alternating current output into direct current, and a low-pass filter is also included in the output side of the phase sensitive rectifier, so that the response speed between the input and output in the whole direct current amplifier is limited of itself. Moreover, the direct current amplifier must stably amplify the absolute value of the input signal as described above, which requires means for negative feedback of the amplifier output to the input side. If such a negative feedback system is adopted, it becomes difficult to obtain the direct current out-put signal in a state of being insulated in direct current from the amplifier. Even if each one end of input and output terminals is grounded to form the so-called two-point ground so as to overcome such difficulty, various troubles are liable to occur.

Accordingly, a principal object of this invention is to provide a novel analog-to-digital conversion system without the above many disadvantages.

Another object of this invention is to provide a cheap analog-to-digital conversion system which is simple in circuit structure.

Other objects, features and advantages of this invention will become apparent from the following description taken in conjunction with the accompanying drawings, in which.

Figure 1:
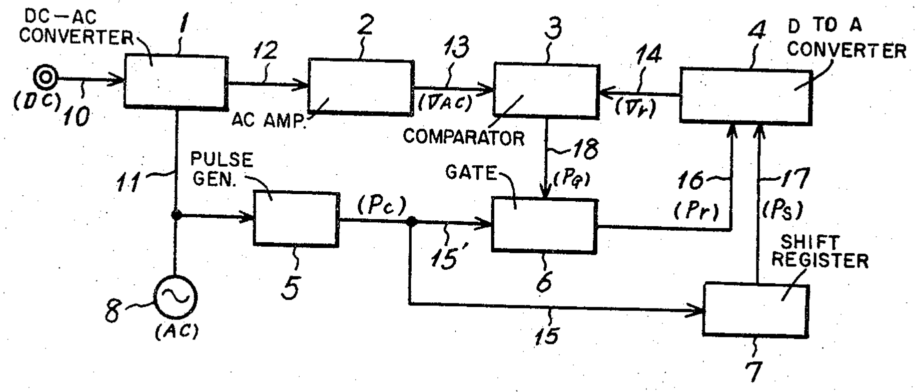
FIGURE 1 is a block diagram, for explaining the principle of this invention.
Figure 4:
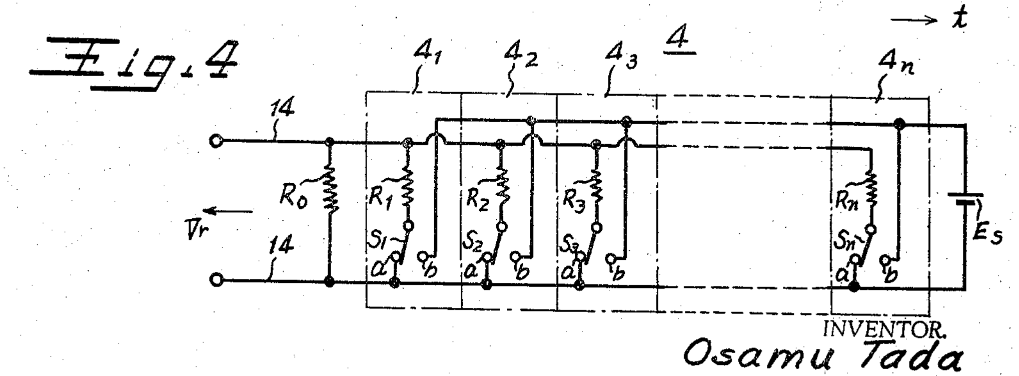
FIGURE 4 is a partial circuit diagram of a digital-to-analog conversion system to be used in this invention.

Referring now to FIGURE 1, it includes in its main part a device for digitizing peak values of alternating voltages and shows a device for converting direct current input signals of low level into digital form. 1 is a DC–AC converter circuit, 2 an AC amplifier circuit and 3 a comparator circuit. As a comparator circuit, it is advisable to use, for example a multiar comparator circuit or a Schmitt trigger circuit, in short the comparator circuit is a circuit in which two voltages are compared and its result is delivered in the form of an electrical signal. 4 is a digital-to-analog conversion circuit, and its example is illustrated in FIGURE 4 in which it is composed of combinations of a direct current reference voltage source $E_s$ and resistance elements $R_0, R_1, R_2 \ldots R_n$, the resistance elements $R_1, R_2 \ldots R_n$ being connected in parallel or in series to the resistance elements $R_0$ respectively through switches $S_1, S_2 \ldots S_n$. With such connection, a reference direct current voltage $V_r$ which varies step by step is delivered to a lead line 14. For example, in FIGURE 4, when obtaining a direct current voltage $V_r$ corresponding to a digital code of an *n*-bit in binary code, the resistance values of the resistance elements are selected respectively to be such that $$R_1=\frac{R_0}{2^{n-1}},\ R_2=\frac{R_0}{2^{n-2}} \cdots R_n=R_0$$

In this case, $R_0, R_1, R_2 \ldots R_n$ are resistance values of the resistance elements, where $n$ is any desired positive integer. When moving contacts of the respective switches are all in contact with a stationary contact *a* as illustrated in FIGURE 4, the circuit is in the so-called cleared condition and the voltage $V_r$ is zero. When the moving contact of the switch $S_1$ alone is in contact with a stationary contact *b* and all the other switches are in contact with the stationary contact *a*, in other words, in a state of a first bit circuit $4_1$ being set, it follows that $$V_r=\frac{E_s}{2}$$

In like manner, when a second bit circuit $4_2$ alone is set $$V_r=\frac{E_s}{2^2}$$

and in the case where an *n*th bit circuit only is set, $$V_r=\frac{E_s}{2^n}$$

That is, a direct current voltage corresponding to MSD (most significant digit) is delivered from the first bit circuit $4_1$ to the lead line 14 and a direct current voltage corresponding to LSD (least significant digit) is delivered from the $n$th bit circuit $\mathbf{4}_n$.

In FIGURE 1, 5 is a pulse generator circuit using a monostable multivibrator circuit and 6 is a gate circuit. 7 is a shift-register circuit composed of a cascade circuit of flip-flop circuits, which delivers a set pulse to each of respective channels $\mathbf{17}_1$, $\mathbf{17}_2$ . . . $\mathbf{17}_n$ at every shot of incoming clock pulses. Such a shift-register circuit is well known by those skilled in the art, and hence no further detailed explanation thereon will be made for the sake of simplicity. 8 is an alternating current source.

In the device shown in FIGURE 1, when an input direct current signal is impressed through a lead line 10 to the DC-AC converter circuit 1 (direct current-alternating current converter circuit 1) driven by the output of an alternating power source 8 through the lead line 11 to its output lead line 12 is delivered an alternating signal of amplitude synchronizing with the alternating current voltage of the power source 8 and in proportion of the amount of the input direct current. The alternating current signal in the lead line 12 is amplified by the alternating current amplifier 2, thereafter being applied as $V_{AC}$ through a lead line 13 to one input circuit of the comparator circuit 3. On the other hand, to the other input circuit of the comparator circuit is applied a direct current reference voltage $V_r$ from the digital-to-analog conversion circuit 4 through a lead line 14.

Suppose that the digital-to-analog conversion circuit 4 has been cleared and the voltage $V_r$ is zero at the start of the operation. When a clock pulse $P_c$ synchronizing with the output alternating current of the power source 8 is applied from the pulse generator circuit 5 through a lead line 15 to the shift-register circuit 7, the flip-flop circuits of the respective stages are successively set at every shot of the clock pulse, in response to which set pulses $P_s$ are successively delivered to a lead line 17. In the digital-to-analog conversion circuit 4, a reference voltage $V_r$ which varies stage by stage from direct current corresponding to MSD to that to LSD is delivered to the lead line 14 at every shot of the set pulse $P_s$ to be added through the lead line 17. Then, a peak value $e_m$ of the alternating current voltage $V_{AC}$ added to the lead line 13 is directly compared with the reference voltage $V_r$ added to the lead line 14 in the comparator circuit 3. In the comparing operation, pulse signals $P_G$ are delivered to a lead line 18 when $e_m \geqq V_r$ only. The gate circuit 6 does not deliver any reset pulse in the presence of the pulse signal $P_G$ in the lead line 18 and delivers a reset pulse $P_r$ to a lead line 16 in the absence of the pulse signal $P_G$. This operation is a characteristic of this invention, so further detailed explanation will be described later on. Thus, the peak value $e_m$ of the alternating signals $V_{AC}$ to be applied to the lead line 13 is successively compared with the output $V_r$ of every bit of the circuit 4 at every one cycle of the signal $V_{AC}$ and then comparison results are digitized in response to whether there is the reset pulse $P_r$ in the lead line 16 or by a combination of the bit circuits of respective stages in the circuit 4.

Figure 2:
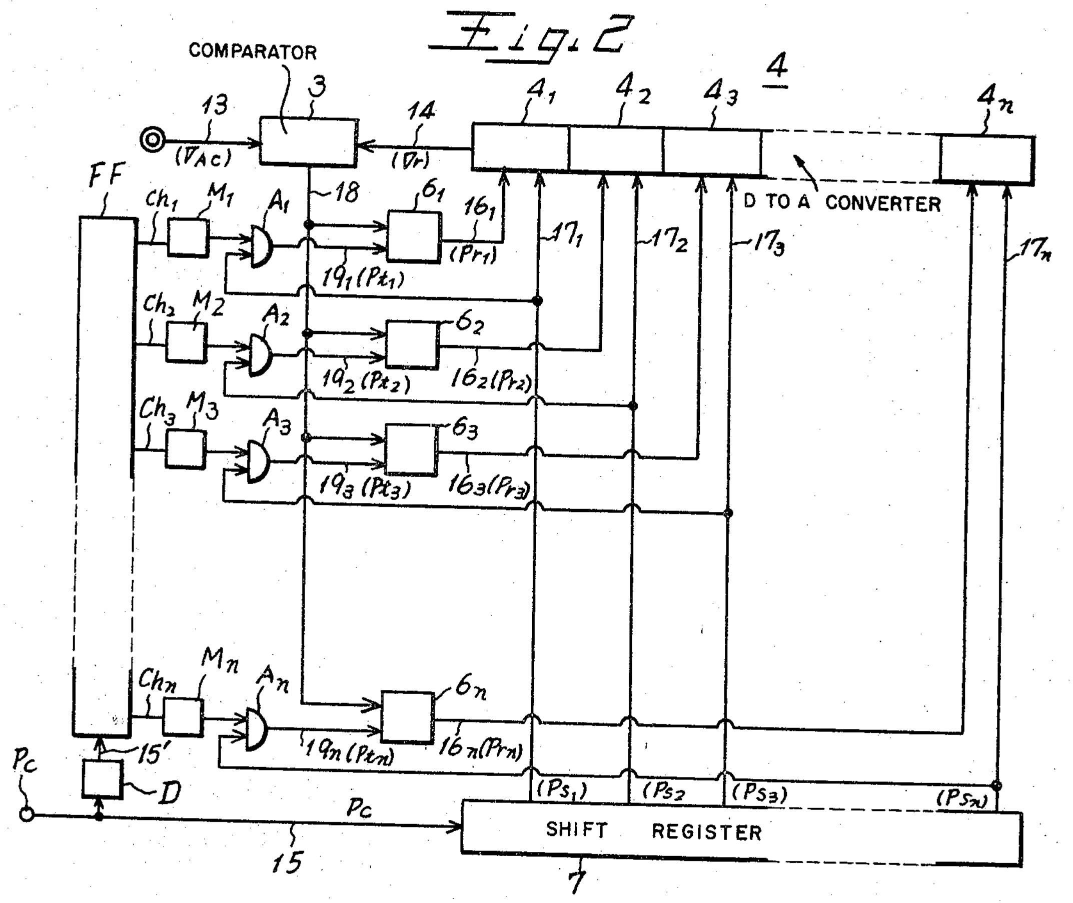
FIGURE 2 is a block diagram illustrating an embodiment of this invention.
Figure 3:
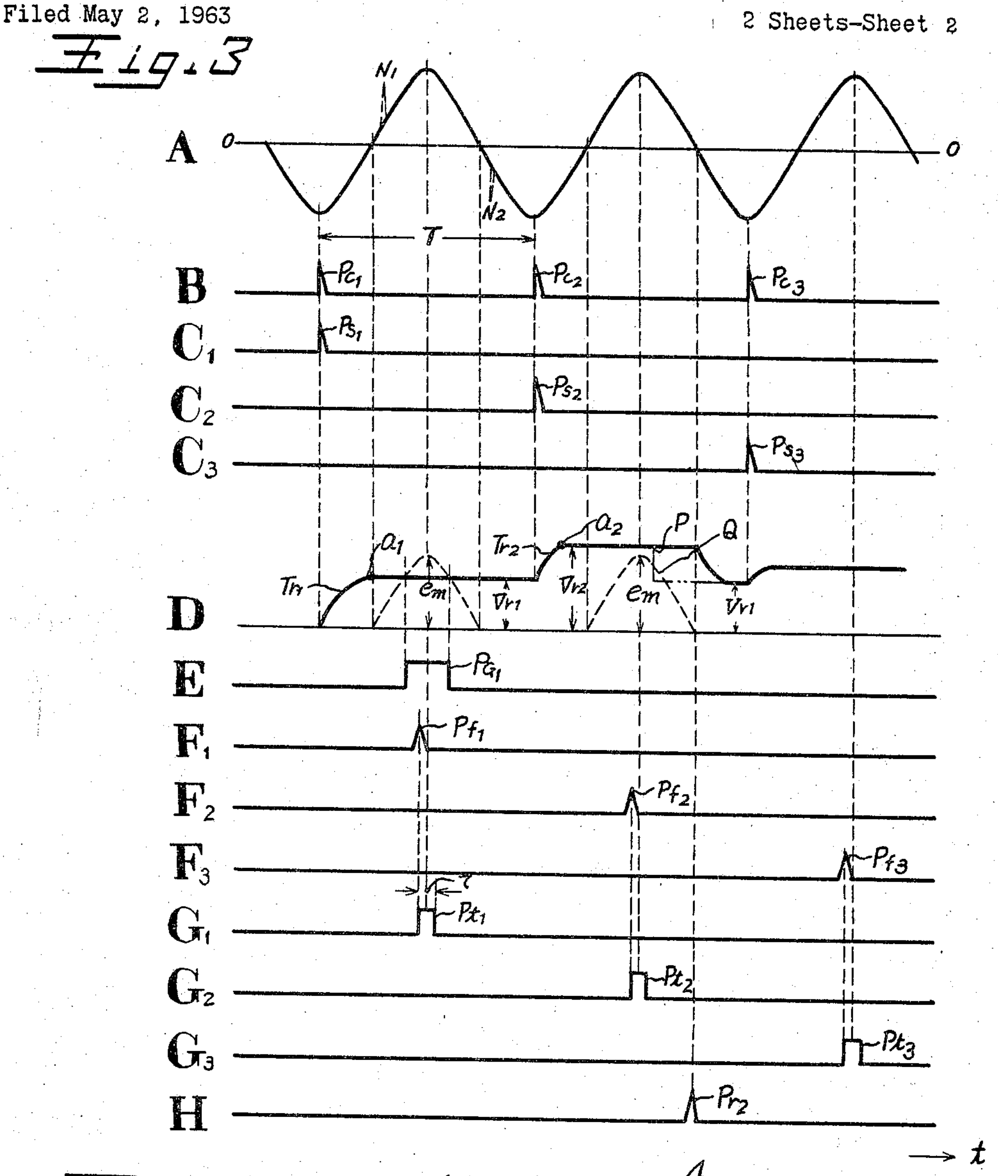
FIGURE 3 shows timing waveform diagrams illustrating the advance of its operation with the lapse of time.

FIGURE 2 is a block diagram illustrating an example in which the peak value of the alternating signal is digitized, which will hereinafter be explained with reference to the timing waveform diagram shown in FIGURE 3.

First, a clock pulse $P_c$ in a lead line 15 to be introduced into a shift-register circuit 7 is a pulse synchronizing with an input alternating signal $V_{AC}$ (FIGURE 3–A) to be applied to a lead line 13, which pulse is produced one by one at a specific phase point (FIGURE 3–B) at every cycle (its period is T sec.) of $V_{AC}$. This pulse $P_c$ is generated by a pulse generator circuit 5, which is desired to be coincident in time with the minus peak of $V_{AC}$. This is because of the fact that although a reference voltage $V_r$ from a digital-to-analog conversion 4 contains a transient portion $T_{r1}$ as shown in FIGURE 4–D, it is desired that the transient portion has terminated at $a_1$ and the reference voltage has reached a regular value until a positive half cycle of the voltage $V_{AC}$ is produced as will be described latter on. Then, a voltage $V_{r1}$ and the maximum value $e_m$ of the voltage. $V_{AC}$ are compared at the positive peak of the voltage $V_{AC}$, by which the comparison therebetween may easily be effected. This is the same with pulses $P_{c2}$, $P_{c3}$ . . . Flip-flop circuits of the respective stages of a shift-register circuit 7 operate successively at every impression of the clock pulse $P_c$, for example a set pulse $P_{s1}$ is delivered to a lead line $\mathbf{17}_1$ upon a first shot $P_{c1}$ of the clock pulse (FIGURE 3–$C_1$), and a set pulse $P_{s2}$ is delivered to a lead line $\mathbf{17}_2$ upon a second shot $P_{c2}$ (FIGURE 3–$C_2$). In like manner a set pulse $P_{s3}$ is produced, and thus a set pulse $P_{sn}$ is delivered to a lead line $\mathbf{17}_n$ upon the impression of an $n$th clock pulse $P_{cn}$. $\mathbf{4}_1$, $\mathbf{4}_2$, $\mathbf{4}_3$ . . . $\mathbf{4}_n$ show respective bit circuits of the digital-to-analog conversion circuit 4 as previously explained with reference to FIGURE 4. At first, when the first bit circuit $\mathbf{4}_1$ is held by the set pulse $P_{s1}$ the reference voltage $V_{r1}$ is delivered to the lead line 14 in response to MSD, and this reference voltage is held by the switch $S_1$ until a reset pulse $P_{r1}$ is applied. When the second bit circuit $\mathbf{4}_2$ is held by the set pulse $P_{s2}$ a direct current voltage corresponding thereto is delivered after added to the voltage $V_{r1}$ which has existed in the lead line 14 until at that time, namely a voltage $V_{r2}$ is delivered (refer to FIGURE 3–D). As illustrated in FIGURE 2, the clock pulses $P_c$ are delayed by a delay circuit D and they are applied to the input side of a circuit FF including a kind of flip-flop circuits so formed as to perform the same function as that of the shift-register 7. The delay time is selected in a manner so that the pulse $P_c$ corresponds to the period of the half cycle of the voltage $V_{AC}$. Thus, the circuit FF produces pulses $P_{f1}$, $P_{f2}$, $P_{f3}$ . . . such as shown in FIGURE 3–$F_1$, $F_2$ and $F_3$ in accordance with its respective channels $ch_1$, $ch_2$, $ch_3$ . . . Then, by connecting mono-multivibrator circuits $M_1$, $M_2$, $M_3$ . . . to be operated by these pulses, pulses $P_{t1}$, $P_{t2}$, $P_{t3}$ . . . are produced which are of certain width $\tau$ such as shown in FIGURE 3–$G_1$, $G_2$ and $G_3$. These pulses are applied respectively to gate circuits $\mathbf{6}_1$, $\mathbf{6}_2$, $\mathbf{6}_3$ . . . $\mathbf{6}_n$ through lead lines $\mathbf{19}_1$, $\mathbf{19}_2$, $\mathbf{19}_3$ . . . $\mathbf{19}_n$.

$\mathbf{6}_1$, $\mathbf{6}_2$, $\mathbf{6}_3$ . . . $\mathbf{6}_n$ are kinds of logic circuits constituting one part of the gate circuit 6 and they form inhibit circuits. The impresion times of the timing signals $P_{t1}$, $P_{t2}$, $P_{t3}$ . . . $P_{tn}$ to be added respectively to the lead lines $\mathbf{19}_1$, $\mathbf{19}_2$, $\mathbf{19}_3$ . . . $\mathbf{19}_n$ are all different as described above. Referring to the circuit $\mathbf{6}_1$ of the logic circuits 6, this operation will hereinbelow be explained. Only when a signal $P_G$ has not ever been applied from a lead line 18 in the presence of the timing signal $P_{t1}$ on the lead line $\mathbf{19}_1$, a reset pulse $P_{r1}$ is delivered to the lead line $\mathbf{16}_1$, being delayed by a certain period. In other cases the reset pulse is never produced. It is made so that the aforementioned timing signals $P_{t1}$, $P_{t2}$, $P_{t3}$ . . . $P_{tn}$ (FIGURE 3–$G_1$ through $G_3$) may be produced only for a very short period $\tau$ sec. ($\tau \ll T$) in the neighborhood of the peaks of first, second, and third cycles of the input alternating signals.

Next, the relationship in time that the input alternating signal $V_{AC}$ is digitized by the above instrument will hereinafter be explained. When the first shot pulse $P_{c1}$ of the clock pulse $P_c$ synchronizing with the input alternating signal $V_{AC}$ to be applied to the lead line 13 enter the shift-resistor 7 through the lead line 15, the set pulse $P_{s1}$ is delivered to the lead line $\mathbf{17}_1$ and the reference voltage $V_{r1}$ is produced in the output lead line 14 of the circuit 4 in response to the weight of the first bit circuit $\mathbf{4}_1$. In this case, the set pulse $P_{s1}$ is produced at a time corresponding to the trough of the waves of the alternating signal $V_{AC}$ as shown in FIGURE 3–$C_1$, so that the reference voltage $V_{r1}$ is compared with the peaks value $e_m$ in a stable period after its transient period $T_{r1}$ (refer to FIGURE 3–D). If the peak value $e_m$ of the signal $V_{AC}$ is larger than the reference voltage $V_{r1}$, a pulse signal $P_{G1}$ is delivered to the lead line 18 for its period (refer to FIGURE 3–E). For this reason, although the timing signal $P_{t1}$ has been applied to the lead line $\mathbf{19}_1$ the reset pulse $P_{r1}$ is not produced in the output lead line $\mathbf{16}_1$ of the logic circuit $\mathbf{6}_1$. Accordingly, the first bit circuit $\mathbf{4}_1$ of the digital-to-analog conversion circuit 4 remains held.

Then, when the second shot pulse $P_{c2}$ of the clock pulse $P_c$ is applied to the shift-register circuit 7 and the reset pulse $P_{s2}$ is delivered to the lead line $\mathbf{17}_2$, the second bit circuit $\mathbf{4}_2$ is held thereby, and a sum $V_{r2}$ of direct current voltages corresponding to the aforementioned MSD and that corresponding to the succeeding unit of MSD is delivered to the lead line 14. This reference voltage $V_{r2}$ is then compared with the peak value of the second cycle of the alternating signal $V_{AC}$. In this case, if $em<V_{r2}$ as shown in FIGURE 3–D, the signal $P_G$ does not appear in the lead line 18 within a period of time during which the timing signal $P_{t2}$ is impressed to the lead line $\mathbf{19}_2$. Hence after a certain period of time a reset pulse $P_{r2}$ is produced in the output lead line $\mathbf{16}_2$ of the logic circuit $\mathbf{6}_2$ (refer to FIGURE 3–H), by which the second bit circuit $\mathbf{4}_2$ is released from being held. Thereafter, similar comparing operations are succesively carried out, and with completion of the operation of an *n*th bit circuit $\mathbf{4}_n$ the digitization of the input alternating signal $V_{AC}$ is finished. This digitization may be expressed in accordance with the fact whether the respective bit circuits of the circuit 4 are held or not.

It is made that the reset pulse $P_{r2}$ is produced behind in time from the timing signal $P_{t2}$ substantially by a quarter cycle from the positive peak of the alternating voltage $V_{AC}$. This delay is effected by the delay circuit provided in the gate circuit $\mathbf{6}_2$. Because it is possible that if the reset pulse $P_{r2}$ is produced in the vicinity of the positive peak of the alternating voltage $V_{AC}$, for example at a point P and the comparison voltage $V_{r1}$ appears as shown in FIGURE 3–D, the alternating current voltage $V_{AC}$ is still larger than the voltage $V_{r1}$ as shown by Q. In this state, unnecessary pulses are liable to enter the gate circuit $\mathbf{6}_2$ through the lead line 18, making the operation of the circuit inaccurate. To avoid this unnecessary trouble, the reset pulse $P_{r2}$ is delayed suitably as explained above.

According to this invention as described above, one bit of the digital code corresponds to one cycle of the alternating signal, so that a period of ten cycles of an alternating signal is required for effecting conversion of ten bits in, for example binary code. In this case, the peak value $e_m$ of the alternating signal $V_{AC}$ is made not to vary in this conversion period. Accordingly, it is sufficient merely to raise the frequency of the alternating signal $V_{AC}$ so as to shorten the conversion period.

As has been described in the foregoing, in the analog-to-digital conversion system of this invention the input alternating signal and the direct current reference voltage are compared only for a short period during which the timing signal is impressed, hence even if a noise signal is included in the alternating signal $V_{AC}$ for a period during which the above timing signal is not impressed, the noise does not ever participate in the digitization. For example, in the case where a transistor chopper is used in the DC–AC converter circuit 1, even if spike noises, for instance $N_1$ and $N_2$ in FIGURE 3–A are produced in an on-and-off changeover period of the transistor chopper, in other words, at a phase point where the polarity of a converted alternating signal is inverted, the digital conversion may be effected without being affected by the noise by shifting the impression period of the timing signal from the phase point where the noise occurs. Furthermore, since direct current input signals of low level may be converted directly from analog to digital form in the form of alternating current large amplitude after converted into alternating current and amplified in the chopper circuit, no synchronous rectifier circuit is necessary, and further a low-pass filter is not required to be provided in its output circuit, so that the response between the input and the output may be performed extremely faster than in heretofore known systems. As explained above, the alternating current signal is directly used, and hence the input and the output may completely be separated with respect to direct current by the use of a transformer.

It will be apparent that many modifications and variations may be effected without departing from the scope of the novel concept of this invention.

What is claimed is:

1. An analog-to-digital conversion system comprising a shift-register circuit for successively producing set pulses upon impression of clock pulses synchronized with input alternating signals, a source of the input alternating signals, a digital-to-analog conversion circuit coupled to said shift-register circuit for successively producing direct current reference voltages in response to the weight of said set pulses, a comparator circuit coupled to said source and said conversion circuit for directly comparing said direct current reference voltage with the peak value of said input alternating signal, a gate circuit coupled to said comparator circuit and to said source to the input alternating signals to be controlled by the output signal of said comparator circuit, and means coupled between said gate circuit and said conversion circuit for re-controlling said digital-to-analog conversion circuit with the output signal of said gate circuit.

2. An analog-to-digital conversion system of direct current signals comprising means for supplying input direct current signals a DC–AC conversion circuit driven by, a source of alternating voltages and coupled to said means for converting said direct current signal to an alternating signal, means coupled to said conversion circuit for amplifying said converted alternating signal, means coupled to said of alternating voltages for generating clock pulses synchronizing with said alternating signal, a digital-to-analog conversion circuit coupled to said means for generating clock pulses and pulses controlled by said clock pulses, a comparator circuit coupled to said digital-to-analog conversion circuit and to said means for converting for directly comparing the output direct current of said digital-to-analog conversion circuit with the peak value of said amplified alternating signal, a gate circuit coupled to said comparator circuit and to said source of alternating current voltage controlled by the output signal of said comparaator circuit, and means coupled to said gate circuit and said digital-to-analog conversion circuit for re-controlling said digital-to-analog conversion circuit with the output signal of said gate circuit.

3. An analog-to-digital conversion system comprising a comparator circuit for directly comparing the peak values of an input alternating signal with the output direct current signal of a digital-to-analog conversion circuit; a source of the input alternating signal coupled to said comparator circuit; a digital-to-analog conversion circuit coupled to said comparator circuit for supplying said output direct current signal, said circuit having respective bit circuits; means for successively setting respective bit circuits of said digital-to-analog conversion circuit with set pulses synchronizing with said alternating signals, means for producing timing signals for a specific short period in the vicinity of the peak value of said signal in synchronism with said alternating signal, a logic circuit group provided in accordance with said respective bit circuits and coupled thereto, each of said logic circuit having an input circuit coupled to said means for producing timing signals for said timing signal to be impressed into said logic circuit, an input lead line coupled to said comparator circuit for the output signal of said comparator circuit to be applied to said logic circuit and an output lead line from said logic circuit, and means for controlling said bit circuits with the output signals of said logic circuits, whereby every one bit of the digital-to-analog conversion is successively compared to be digitized every cycle of the input alternating signal.

(References on following page)

References Cited

UNITED STATES PATENTS

| | | | |
|---|---|---|---|
| 2,845,597 | 7/1958 | Perkins | 324—103 |
| 2,865,564 | 12/1958 | Kaiser | 340—347 |
| 2,970,309 | 1/1961 | Towles | 340—347 |
| 3,019,426 | 1/1962 | Gilbert | 340—347 |
| 3,070,786 | 12/1962 | MacIntyre | 340—347 |

DARYL W. COOK, *Acting Primary Examiner.*

MAYNARD R. WILBUR, *Examiner.*

A. L. NEWMAN, W. KOPACZ, *Assistant Examiners.*